US008572388B2

(12) United States Patent
Boemker et al.

(10) Patent No.: US 8,572,388 B2
(45) Date of Patent: Oct. 29, 2013

(54) ELECTRONIC DOCUMENT MANAGEMENT SYSTEM

(75) Inventors: Tim Boemker, Cincinnati, OH (US); Mark Keller, Cincinnati, OH (US); Chip Schock, Cincinnati, OH (US); Mark E. Kleingers, West Chester, OH (US); Phillip E. Huff, Liberty Township, OH (US); Terrance P. Gieske, Crestview, KY (US); James D. Gersten, Cincinnati, OH (US); John E. Danner, Cincinnati, OH (US)

(73) Assignee: eLynx, Ltd., Cincinnati, OH (US)

( * ) Notice: Subject to any disclaimer, the term of this patent is extended or adjusted under 35 U.S.C. 154(b) by 1587 days.

(21) Appl. No.: 11/623,606

(22) Filed: Jan. 16, 2007

(65) Prior Publication Data

US 2008/0034213 A1    Feb. 7, 2008

Related U.S. Application Data

(63) Continuation-in-part of application No. 11/076,665, filed on Mar. 10, 2005.

(60) Provisional application No. 60/551,844, filed on Mar. 10, 2004, provisional application No. 60/758,678, filed on Jan. 13, 2006, provisional application No. 60/792,504, filed on Apr. 17, 2006.

(51) Int. Cl.
    *H04L 9/32* (2006.01)
(52) U.S. Cl.
    USPC .............. 713/176; 726/20; 726/28; 713/168; 705/64; 705/75

(58) Field of Classification Search
    USPC ............ 726/28, 20; 713/168, 176; 705/64, 75
    See application file for complete search history.

(56) References Cited

U.S. PATENT DOCUMENTS

| | | | |
|---|---|---|---|
| 4,326,098 A | 4/1982 | Bouricius et al. | |
| 4,924,514 A | 5/1990 | Matyas et al. | |
| 5,677,955 A | 10/1997 | Doggett et al. | |
| 5,719,940 A | 2/1998 | Ahn et al. | |
| 5,790,790 A | 8/1998 | Smith et al. | |
| 5,805,810 A | 9/1998 | Maxwell | |
| 5,870,721 A | 2/1999 | Norris | |
| 5,878,405 A | 3/1999 | Grant et al. | |
| 5,915,024 A | 6/1999 | Kitaori et al. | |
| 5,940,811 A | 8/1999 | Norris | |
| 5,948,103 A | 9/1999 | Fukuzaki | |
| 6,021,202 A | 2/2000 | Anderson et al. | |

(Continued)

OTHER PUBLICATIONS

Tumbleweed Communications, "Tumbleweed Secure Email for Customer Partner Communications", http://www.tumbleweed.com/en/industries/financial_services/secure_email_services.html; printed Feb. 10, 2004, (2 pages).

(Continued)

*Primary Examiner* — Kaveh Abrishamkar
(74) *Attorney, Agent, or Firm* — Wood, Herron & Evans, LLP

(57) ABSTRACT

A method, apparatus and program product provide a mechanism for managing the execution of electronic documents using electronic signatures. Documents requiring electronic signatures are automatically identified, mined, trimmed and split from a printer control data language stream. Status information pertaining to needed data, signatories, signature completions and authentication attempts is related to users during and after an electronic signing sequence.

2 Claims, 16 Drawing Sheets

(56) References Cited

U.S. PATENT DOCUMENTS

| | | | |
|---|---|---|---|
| 6,044,349 A | 3/2000 | Tolopka et al. | |
| 6,055,514 A | 4/2000 | Wren | |
| 6,061,448 A | 5/2000 | Smith et al. | |
| 6,064,751 A | 5/2000 | Smithies et al. | |
| 6,091,835 A | 7/2000 | Smithies et al. | |
| 6,105,007 A | 8/2000 | Norris | |
| 6,119,137 A | 9/2000 | Smith et al. | |
| 6,151,675 A | 11/2000 | Smith | |
| 6,185,683 B1 | 2/2001 | Ginter et al. | |
| 6,192,407 B1 | 2/2001 | Smith et al. | |
| 6,209,091 B1 | 3/2001 | Sudia et al. | |
| 6,209,095 B1 | 3/2001 | Anderson et al. | |
| 6,307,955 B1 | 10/2001 | Zank et al. | |
| 6,347,307 B1 | 2/2002 | Sandhu et al. | |
| 6,356,937 B1 | 3/2002 | Montville et al. | |
| 6,487,599 B1 | 11/2002 | Smith et al. | |
| 6,609,200 B2 | 8/2003 | Anderson et al. | |
| 6,615,348 B1 | 9/2003 | Gibbs | |
| 6,671,805 B1 * | 12/2003 | Brown et al. | 713/176 |
| 6,711,554 B1 | 3/2004 | Salzmann et al. | |
| 6,968,458 B1 | 11/2005 | Ruddle | |
| 2002/0002590 A1 | 1/2002 | King et al. | |
| 2002/0019838 A1 | 2/2002 | Petrogiannis | |
| 2002/0053021 A1 * | 5/2002 | Rice et al. | 713/155 |
| 2002/0054334 A1 * | 5/2002 | Harrison et al. | 358/1.15 |
| 2002/0078159 A1 | 6/2002 | Petrogiannis et al. | |
| 2002/0091651 A1 | 7/2002 | Petrogiannis et al. | |
| 2002/0091782 A1 | 7/2002 | Benninghoff, III | |
| 2002/0188689 A1 | 12/2002 | Michael | |
| 2003/0126463 A1 | 7/2003 | Sistla | |
| 2003/0142364 A1 | 7/2003 | Goldstone | |
| 2003/0231207 A1 | 12/2003 | Huang | |
| 2004/0133774 A1 | 7/2004 | Callas et al. | |
| 2004/0171369 A1 | 9/2004 | Little et al. | |
| 2005/0114658 A1 | 5/2005 | Dye et al. | |

OTHER PUBLICATIONS

Tumbleweed Communications, "Secure File Transfer for Payments and Messaging", http://www.tumbleweed.com/en/industries/financial_services/sft_financial_services.html; printed Feb. 10, 2004, (2 pages).

* cited by examiner

FIG. 6 lynx

Documents have been prepared for

Loan: HOM-01088

For the property at:
1 Walnut Avenue
Sharonville, OH 45242

Your Loan Officer Is:
Rob Smith

Phone: (999)999-9999
Email: rep1@elynx.com

} 912

Please Review
and
Sign Your Documents review & sign    logout

Click Here To View The
HUD Guide To Buying Your Home

These documents need to be signed by:
Charlie Murphy
1111111111
Phone:
Email: usb1@elynx.com

ELECTRONIC DOCUMENT MANAGEMENT SYSTEM

CROSS-REFERENCE TO RELATED APPLICATIONS

This application is a Continuation-In-Part of U.S. patent application Ser. No. 11/076,665, filed on Oct. 20, 2005 by Phillip E. Huff et al., which application claims the benefit of priority to U.S. Provisional Application No. 60/551,844, filed on Mar. 10, 2004 by Phillip E. Huff et al., and claims benefit of priority to U.S. Provisional Application Nos. 60/758,678, filed on Jan. 13, 2006 by Tim Boeniker et al., and 60/792,504, filed on Apr. 17, 2006 by Tim Boeniker et al. and entitled "Electronic Document System", each of which is incorporated by reference herein in its entirety.

FIELD OF THE INVENTION

The present invention relates to computer systems and applications, and more particularly, to the use of digital signatures within computer systems to reliably demonstrate a sender's acknowledgment and/or affirmation of the contents of an electronic message.

BACKGROUND OF THE INVENTION

Binding agreements are at the core of all commercial and societal transactions. Individuals, government and business entities increasingly rely on the accessibility, speed and other advantages of computer based communications to facilitate such business transactions. As with any agreement, a party is legally bound to obligations undertaken in a transaction when proof evidences that the party agreed to, validated or otherwise affirmed the transaction. Similarly, that party can be held accountable for the truth of a statement or the consequences of a sanctioned act where proof shows the party condoned or affirmed the activity or statement. The nature of computer transactions, however, does not involve the face-to-face interaction between agreeing parties conventionally used to sign or otherwise consummate such agreements.

Institutions have consequently developed practices useful in authenticating non-face-to-face computer transactions. For instance, electronic signatures are used in connection with electronic messages to provide a way for the sender of a message to electronically "sign" the message. The electronic signature functions similarly to a conventional signature in that it provides proof of the identify of the sender and can validate a sender's acknowledgment of the content of the message.

More particularly, an electronic signature may include an electronic sound, symbol or process attached to or logically associated with a contract or other record. The record is executed or adopted when a person signs the record. This signing may be accomplished using a signature comprising a password, token, digitized image, knowledge based authentication and/or a biometric record. An electronic signature thus includes any electronic identifier created by a computer and intended by a party using is to have the same force and effect as a manual signature.

Electronic signatures typically use an asymmetric cryptosystem to ensure document integrity, security and authenticity of an electronic document. Namely, a sender digitally signs the message using a private key. The key includes encryption software used to create a digital signature. The receiver validates the sender's digital signature using a public key of the sender. The public key includes software sent by the receiver used to decrypt the digital signature on the document. Exemplary documents may include any record that is generated or stored on a computer, such as a letter, a tax form, a contract, or a will. In addition, an electronic document may include an image, such as a blueprint, a survey plat, a drawing, or even a photograph. An electronic signature may be used to sign these documents types.

While electronic signatures provide assurances as to the intention and identity of the sender, the underlying programming associated with electronic signature practices can limit their application in the context of certain types of transactions. For instance, a different program template must generally be created for each transaction that involves a new agreement format. That is, the program code used to place a digital signature on a given form must be manually modified or replaced in order to execute a similar signature on another agreement.

Each unique form for a particular transaction and of a particular lender often requires an electronic signature at a particular point that is unique to that form. For instance, even a relatively generic lending form may require placement of the electronic signature at slightly different relative coordinates. Though such differences may be largely imperceptible to a loan applicant, the subtle differences nonetheless require unique programming and configuration of the electronic signature program to ensure proper placement of the electronic signature at the different relative document position. Put another way, even minor differences in the forms will require different programmatic instructions. Such instructions dictate where and how a signature must be accomplished within the new or altered document.

This requirement to create a new program profile is a potential source of inefficiency and substantial expenditures for certain businesses. For instance, many commercial lending operations involve hundreds of proprietary forms. Each form requires its own programming template to be accomplished. Moreover, each form may be altered over time in accordance with government regulations and client requirements. As such, each form can require additional programming. As a consequence, lenders must wait for a programmer to manually set up required programming so that a transaction can proceed. Such program requirements can unduly delay the execution of electronic signatures, holding up time sensitive transactions or altogether obviating their practicality. Such requirements further undermine the speed and automation that generally benefit electronic loan processing. Moreover, existing systems do not support boolean (checkbox) output text, or "prior approval" practices endemic to many financial transactions. There is also no systematic way of knowing with certainty that a user is actually able to view digitized form.

The inflexible nature of conventional electronic signature practices further requires a loan officer or programmer to manually and individually identify each document so that it can be properly matched to its appropriate signing algorithm template. In the context of hundreds or thousands of documents, this manual submission represents an additional source of inefficiency. Furthermore, certain types of documents must be timely executed in a particular sequence and/or by multiple signatories. Conventional electronic signing programs provide no mechanism that ensures that multiple signatures are accomplished, or that they are executed in a required sequence.

Consequently, and for in part the above delineated reasons, there exists a need for an improved manner of managing an electronic document signing process.

SUMMARY OF THE INVENTION

The present invention provides an improved apparatus, method and program product for managing the execution of documents requiring electronic signatures.

Specifically, in a first aspect, a signable document is presented to a signer for authentication in a manner that demonstrates the signer's ability to access the information in the document. The signable document is formatted as an electronic package in a storage format, and an access demonstration document is formatted in that same format. When a signer attempts to sign documents, the access demonstration document is presented to the user, and the user is required to return information from the access demonstration document, such as a code, as part of the authentication. As a result, it can be demonstrated that the signable document, which is presented in the same format, is accessible to the user.

In a second aspect, the invention provides a method of authenticating documents that extends beyond the generation of signatures per se, to selection of boolean variables (e.g., check boxes), and entry of text by a signer. With suitable logical structures, the user can also be presented with choices that are logically exclusive choices (aka, radio buttons), which can be electronically selected. As a result, the acquired authentication of the signable document from the user includes such additional types of authentication.

In a third aspect, the invention features a method of presenting a document to multiple signers for electronic authentication, in which a document that is to be signed by two signers may permit concurrent authentication sessions by the two users. Specifically, while a first user is being presented with the document for authentication and an authentication system is receiving authentication from the first user, the document may also be presented to a second user in a second, concurrent authentication session.

In a fourth aspect, the invention features a method of presenting a document to signer in a manner that can show pre-approval by the document processor. Specifically, a batch authentication process is used to authenticate documents on behalf of a processor or its representative, whereas the signature of the documents by the other signers uses a separate authentication process, which need not be a batch process. Thus, a processor can batch-authenticate documents, in batch, prior to delivering them to individual signers, and in this way the individual signers can be presented with a document that is pre-approved by the processor.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

FIG. 6 shows an exemplary computer interface screen configured to display cover page information presented during the processes of FIG. 4.

FIG. 10 shows an exemplary computer interface screen configured to display identifying and status information after a user successfully logs in.

FIG. 11 shows an exemplary computer interface screen that includes a document configured for electronic signature.

FIG. 12 shows an exemplary computer interface screen that includes a listing of documents available for download and incorporation into a payload package.

FIG. 13 shows an exemplary computer interface screen that includes information pertaining to the status of a document.

DETAILED DESCRIPTION OF DRAWINGS

Figure 1:
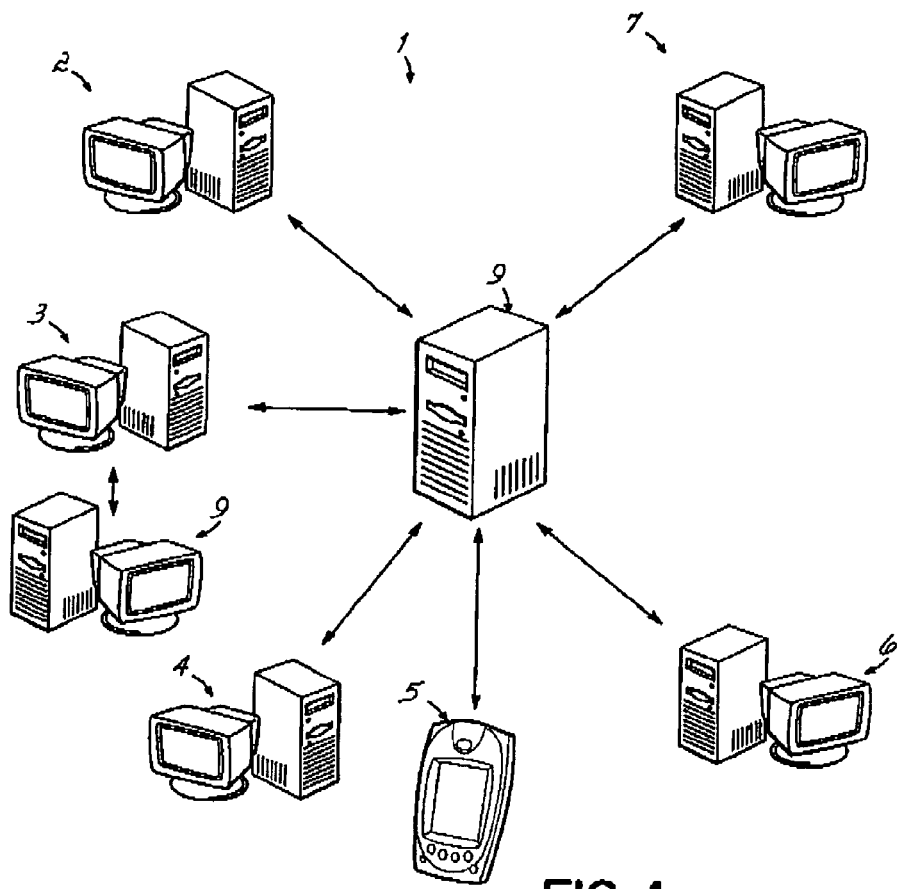
FIG. 1 is a block diagram of a computer system configured to manage execution of electronic documents.

FIG. 1 shows a client-server based computer system 1 that is configured to affirm or otherwise manage electronic documents. System 1 includes at least one apparatus, e.g., one or more client computers 2-8 and at least one server computer 9. For the purposes of the invention, each computer 2-9 may represent practically any type of computer, computer system or other programmable electronic device capable of functioning as a client and/or server in a client-server environment. Moreover, each computer 2-9 may be implemented using one or more networked computers, e.g., the public Internet, an intranet or other distributed computing system. As such, multiple client computers 2-8 typically interface directly or indirectly with the server computer 9.

In the context of a consumer lending operation, a number of loan applicants and lenders communicate with the central server 9 using devices 2-8. One skilled in the art will appreciate that certain loan applications may include hundreds of lenders, each lender having hundreds of proprietary, different forms. The server 9 may receive data from the lenders that includes PCL streams, as well as update and status requests. PCL, most popularly the control language promulgated by Hewlett-Packard, allows a print stream from a legacy system to be captured as it is delivered from the printer port of the legacy server. The print stream is then saved and electronically transmitted to other locations where the print stream can then be delivered to a printer to print the desired document.

PCL data frequently includes forms for business practices, such as consumer lending processes. Computer generated forms provide greater efficiency and accuracy, as well as a more professional presentation than forms created using a typewriter for each transaction.

An electronic transaction for purposes of this specification may include stored data that evidences a fact or circumstance of an electronic affirmation of a document or event. For example, a transaction may include signing of an electronic document, the negotiation of an electronic sale, the affirmation of statements such as those recorded in a will or deposition, and the validation or verification of accountings, spreadsheets, applications, blueprints, government filings and other recorded documents.

The server 9 may process the incoming PCL data to sort, capture, designate signature sites and otherwise manage the data and requests communicated from the lender/applicant computing devices 2-8. As discussed herein, such processing may include split and trim features, which may separate PCL streams into respective documents. To this end, a content identification feature may assist in identifying forms and other information embedded within the PCL stream. Such identification may include the automatic evaluation of hash codes or other identifiers embedded in a PCL stream. Where applicable, data that is mined, or sampled from the PCL stream may be used to populate a database and/or another form maintained by a lender or server application.

In one respect, the server 9 facilitates the execution of electronic signatures required on forms by lending institutions. To this end, the devices 2, 3, 6, 7 of the lenders submit the forms requiring electronic signatures to the server 9. Electronic signatures for purposes of this specification may include password, token, image, audio and biometric technologies. As noted above, each respective lender may require the execution of hundreds of different and/or unique forms. In that sense, the central server(s) 9 is configured to flexibly and automatically identify, process and otherwise manage the execution of thousands of forms.

Each lending machine 2, 3, 6, 7 may submit their respective forms in a single PCL stream. Numerous forms may be thus sent in batch, or together in a single transmission for efficiency and processing considerations. As such, the server 9 may be further configured to identify each document within each PCL stream for processing and management.

A loan officer and/or applicant may be present at each lender device 2, 3, 6, 7. Additionally, loan applicants may communicate remotely with a lender and/or directly with server 9 to provide required application information and to receive status information. Such a feature may provide users with desired convenience, privacy and accessibility. For instance, a personal computer 8 of a loan applicant may communicate via an Internet connection with a website hosted by their bank's server computer 3. The personal computer 4 of another loan applicant may send update information directly to the server 9, while a personal digital assistant 5 of another user receives status information pertaining to execution of a particular loan document.

Figure 2:
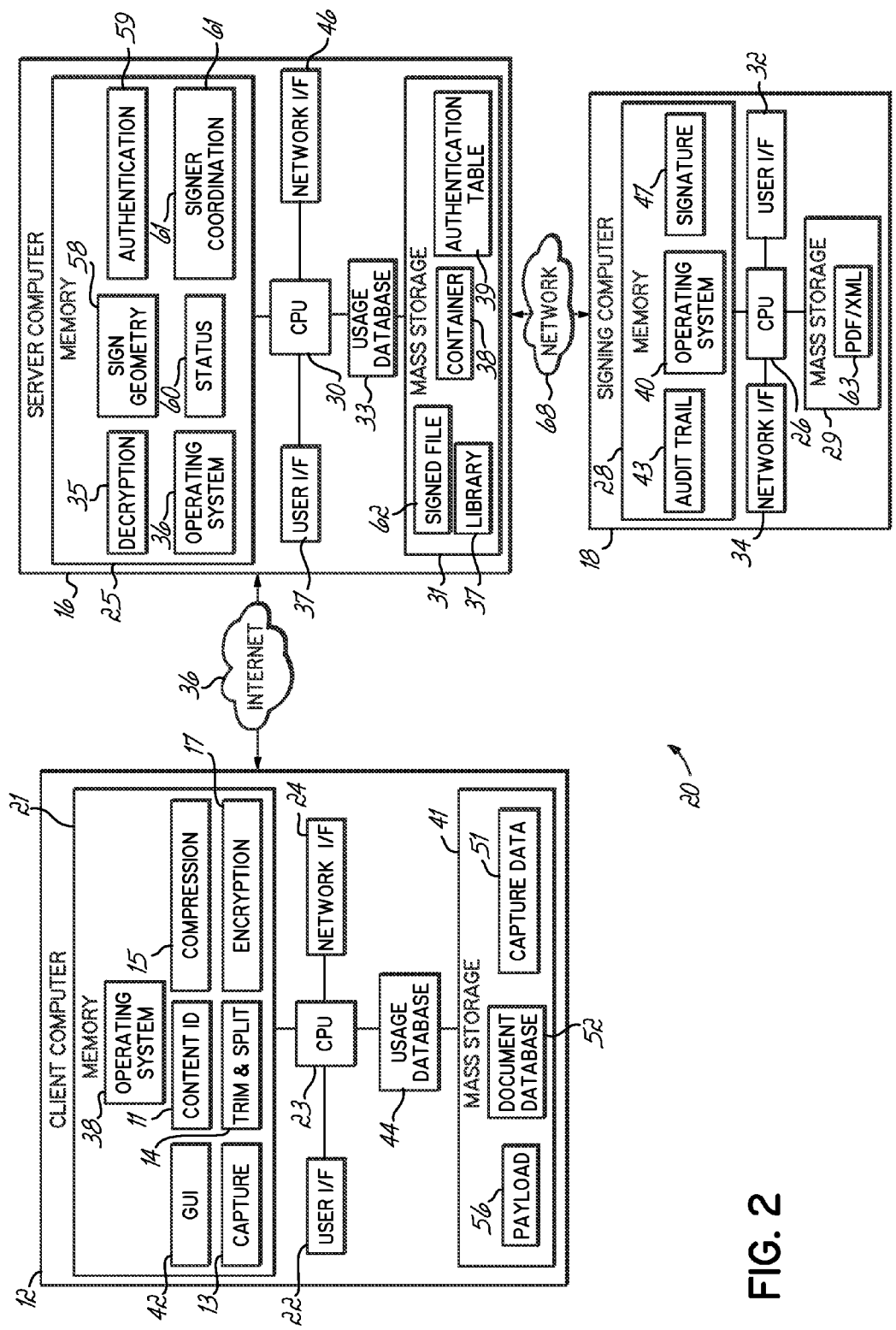
FIG. 2 is a block diagram showing a client-server computer system in a distributed network environment analogous to that of FIG. 1.

FIG. 2 illustrates an embodiment of a networked computer system 20 configured to manage execution of electronic documents. More particularly, the system 20 includes at least one client computer 12, in addition to one or more server computers 16, 18. The server computer 16 and/or the signing server computer 18 may be analogous to the server computer 9 shown in FIG. 1. Client computer 12 may be analogous to a lender/client computer 2 of FIG. 1. While more capable computer systems may present advantages in certain embodiments consistent with the principles of the present invention, a suitable computer for purposes of this specification may comprise practically any device configured to receive and process an electronic message transmitted from another networked computer.

Client computer 12 includes at least one central processing unit 23 that couples to a memory 21. Memory 21 may include random access memory (RAM) devices comprising the main storage of computer 12, as well as any supplemental levels of memory, e.g., cache memories, non-volatile or backup memories (e.g., programmable or flash memories), read-only memories, etc. For instance, the memory 21 may include program code 11 configured to determine the content of a PCL stream. Another program 13 may mine, or sample and copy, data out of the PCL stream. A trim and split program 14 residing in memory 21 may be configured to separate different documents delivered in batch via the PCL stream.

Encryption and compression program code 15 and 17, respectively, may further format data according to user specifications. Encryption is the process of using a mathematical algorithm to transform information into a format that is hard to read. This format is called ciphertext. Still another exemplary program 42 may initiate display of a graphic user interface (GUI) on a monitor of the client computer 12. In addition, memory 21 may be considered to include memory storage physically located elsewhere in the computer 12, e.g., any cache memory in a processor or a smart card, as well as any storage capacity used as a virtual memory, e.g., as stored on a mass storage device 41 or on another computer coupled to the computer 12.

Computer 12 typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 41, e.g., a floppy or other removable disk drive, a hard disk drive, a direct access storage device (DASD), an optical drive (e.g., a CD drive, a DVD drive, etc.), smart card and/or a tape drive, among others. The exemplary mass storage 41 may include a registry or database 52 that includes identifiers indicative of different forms. These identifiers may be compared to a hash code or other indicator in a PCL stream to identify documents included in the PCL stream. The mass storage 41 may also include stored payload packages 56, as well as stored capture data 51 mined from the PCL stream. In any case, one of skill in the art will recognize that the inclusion and distribution of the databases, files and other stored data may be altered substantially while still conforming with the principles of the present invention.

Client computer 12 may also include an interface 24 with one or more networks (e.g., a LAN, a WAN, a wireless network, and/or the Internet 36, among others) to permit the communication of information with other electronic devices. It should be appreciated that the client computer 12 typically includes suitable analog and/or digital interfaces between CPU 23 and each of its respective computer components as is well known in the art.

Similar to client computer 12, server computer 16 includes a CPU 30, memory 25, mass storage 31, user interface 45 and network interface 46. Memory 25 may include a decryption program 35 to process an incoming payload package arriving from the client computer 12. Decryption is a process that uses an algorithm to transform encrypted information back into a readable format, called plain text. Another program 58 in memory 25 accesses a geometry library 37 to determine signature points in a given document. An authentication program 59 verifies that a user attempting to access server data is authorized as such. A status program 60 tracks activity relating to execution of documents, and a coordinating program 61 separately manages mechanics relating to having multiple persons authorize a given document set.

Mass storage 31 of server computer 16 includes stored data 39 used to authenticate password, token and/or biometric login data submitted by a user. A container 38 includes a document set, and additional storage 62 may be allocated for Portable Document Format (PDF)/XML files not included in the documents set. A PDF file includes a standard format for distribution of electronic documents and forms that preserves fonts, images, graphics and layout parameters. XML is a markup language for documents containing structured information. Such structured information typically includes both content (words, pictures, etc.) and some indication of what role that content plays. For example, content in the section heading may have a different meaning from content in a footnote. A markup language is a mechanism used to identify structures in a document. As with the other computers 12, 18 shown in FIG. 2, server computer 16 may comprise multiple additional programs, storage and computers.

Similar to server computer 16, signing server computer 18 includes a CPU 26, memory 28, mass storage 29, user interface 32 and network interface 34. Memory 28 may include a program 43 for compiling an audit trail. A signing program 47 may cause an electronic signature to be placed on a document according to a designated signature point communicated from the server computer 16. Computer 18 may additionally store copies 63 of executed/signed documents.

Computers 12 and 16 are generally interfaced with one another via a network 36, which may be public and/or private, wired and/or wireless, local and/or wide-area, etc. As shown in FIG. 2, network 36 includes the Internet. As such, network 36 may represent multiple, interconnected networks. Such an arrangement facilitates ready access to information stored on the respective computers 12 and 16, as well as timely notifications and updates. Communication between signing server computer 18 and server computer 16 is facilitated by another network connection 68, which may include a secure intranet. However, connection 68 may also include a publicly switched network, where appropriate.

Each computer 12, 16 and 18 operates under the control of an operating system 36, 38, 40 and executes or otherwise relies upon various computer software applications, components, programs, objects, modules, data structures, etc. Moreover, various applications, components, programs, objects, modules, etc. may also execute on one or more processors in another computer coupled to computer 12, 16 and 18 via a network, e.g., in a distributed or customer-billing computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 3:
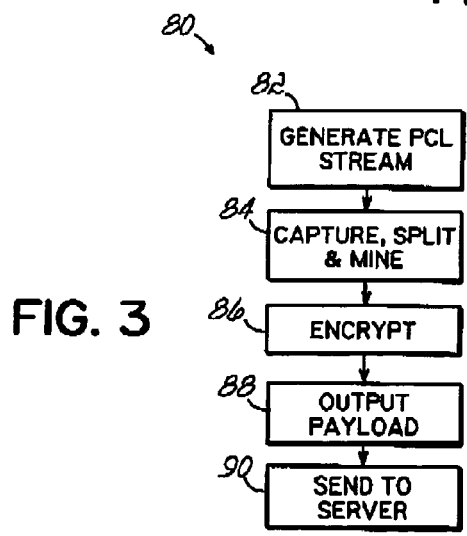
FIG. 3 is a flowchart having a sequence of steps executable by the client computer of the system of FIG. 2 for creating and managing a payload package that is sent to a server computer for electronic signature.

The flowchart 80 of FIG. 3 includes a sequence of exemplary method steps for creating and managing a payload package that is sent to a server computer for electronic signature. The steps of the flowchart 80 are particularly suited for execution by the client computer 12 of FIG. 2. A typical payload package includes at least one document presented in PCL data. Such a PCL stream may include more than one document for transmission efficiency and processing considerations. As such, header or other data that includes hash codes may be embedded within the PCL data stream to assist in later distinguishing the documents.

More particularly, the PCL stream includes hash codes useful in identifying the documents and other information pertinent to the data in the PCL stream. Such hash codes may be included within an identification segment of the PCL stream as is known in the art. The parameters of the hash code may be configured to coincide with data that will be mined, or sampled from the PCL stream. This identification data may further coincide with data determined to be needed for inclusion within documents prior to signing. For example, such information may indicate that a particular document must be signed three times each by two different persons.

As such, a hash code typically comprises a sixteen bit numerical sequence that may function as a virtual fingerprint for use in identifying a particular document. That is, the hash code may be compared to known codes that are stored in a document database 52. When a match is found, the form can be identified. Such identification prompts the recall of applicable signature points, for instance.

The client computer 12 typically generates the PCL stream at block 82 of FIG. 3. As is known in the art, generation of the PCL data may include a user initiating a print command designating one or more loan documents.

Document management processes of block 84 may proceed to capture, split and mine the PCL stream. While discussed below in greater detail, the processes of step 84 may include scanning a first document of the PCL stream to locate data indicative of the end of that document. Such data may include flags designated by or including the hash codes embedded in the PCL stream. Similarly, a process of block 84 may locate data indicative of a second document in order to separate PCL language of the respective documents. Splitting processes at block 84 may include programmatically separating or otherwise distinguishing different documents included in the same PCL stream. Such scanning and splitting features facilitate the sending of multiple documents within a single PCL stream, which in turn, enables improved processing and transmission efficiencies.

Other features of block 84 may include capturing data from the PCL stream. For example, identification data that populates a cover sheet of a PCL stream may be mined. Such identification data may include, for instance, an address, a phone number, an email address, a name, title, company and most any other identifying attribute. This data may have originally been entered into the cover sheet or other document by an applicant or loan officer. During and subsequent to mining, the data in the cover sheet is copied and pasted into the applicable fields of other documents. Mining features thus mitigate keystrokes and other inefficiencies. Such information may include user identification data.

Such captured data may include authentication data used to verify the identity of a loan applicant during a status check or other step of a signing process. Authentication and other data captured from the PCL stream may be stored in a database 51 maintained by the client computer for use in automatically populating subsequent documents and/or client prompts. For instance, captured authentication data may be used in a GUI prompt at the client computer 12 to verify the identity or privileges of the user. As is discussed in greater detail below, user input may similarly guide certain other processes associated with block 84.

Where desired, the mined and split PCL data is then be encrypted at block 86. A payload package comprising the encrypted data of block 86 may be output and sent to the server at blocks 88 and 90, respectively. The payload package may be temporarily stored on the client computer 12 for backup and accounting purposes.

Figure 4:
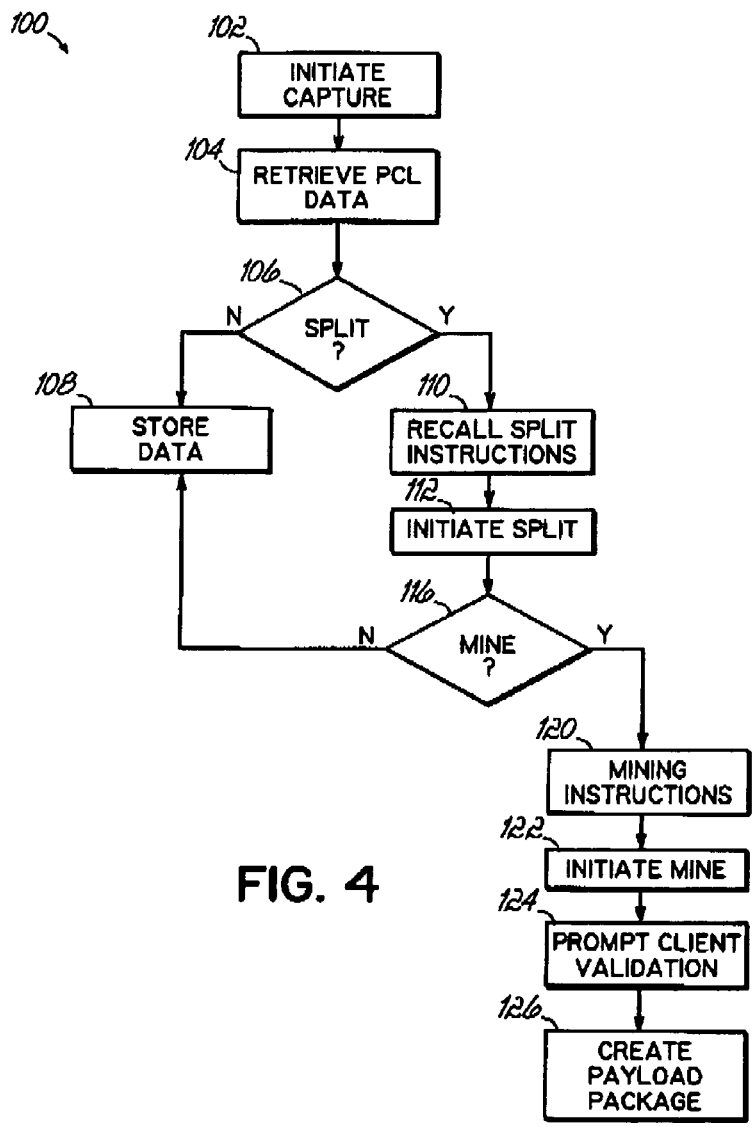
FIG. 4 is a flowchart having a sequence of steps that further describe the capture, split and mine processes of FIG. 3.

FIG. 4 includes a set of exemplary sequence steps suited for execution by the client computer 12 of FIG. 2. More particularly, the steps of the flowchart 100 further describe the capture, split and mine operations of step 84 of FIG. 3. As such, FIG. 4 presupposes that a customer has printed a loan package to a printer. Such a print action may generate a PCL stream as discussed above.

At block 102 of FIG. 4, a capture event is triggered in response to generation of the PCL stream. The PCL stream is accessed at block 104, and the operating system 38 of the client computer 12 may determine at block 106 if the PCL stream can be split. As discussed herein, splitting refers to dividing the content of a PCL stream into multiple documents. The determination may include an evaluation of flags, hash codes or other identifiers embedded within the PCL stream.

Where no such splitting is appropriate or possible at block 106, the file may be stored for later use at block 108. Where the PCL stream may conversely be split at block 106, then the operating system 38 initiates a splitting operation at block 110 by retrieving document data from a document database 52. Such document data may include programmatic information used by the operating system 38 to identify end and beginning portions of distinct documents. Such information may be provided from a particular lender or may be manually or automatically determined from an incoming PCL stream. For instance, a program 14 of the client computer 12 may be configured to automatically identify key points of a document based on input document parameters, spacings, symbols and other document parameters. Such points may include where a document ends or requires electronic signature, for instance. Of note, such identification processes are not limited to splitting functions and may also apply to identifying the type of document, itself.

The PCL stream may be split into separate documents at block 112 of FIG. 4. These documents will later be presented to the client via a GUI interface, for instance, to verify the accuracy of their contents.

At block 116, the operating system 38 of the client computer 12 may determine if one or more of the documents can be mined. Mining generally refers to programmatically sampling data from the PCL stream that may be separately stored and later used in related processes. For instance, repeatedly useful identification and/or authentication data may be included in a cover sheet for mining.

As such, a cover sheet may include an additional document generated automatically by the operating system 38 for later use in facilitating the electronic signing of the loan document. The cover sheet may include pertinent data that may be particularly useful in subsequent processes. For instance, such pertinent data may include a social security or loan number, as well as an address of an applicant. Such pertinent data may automatically be used to populate fields of additional forms implicated during an electronic signing process.

Where such mining is possible at block 116, pertinent definitions may be retrieved to facilitate the mining at block 120. Such definitions may include location fields indicative of where the pertinent information should be sampled. For instance, a definition may dictate that a field located between a middle initial and a suffix be mined automatically at block 120. At block 122 of FIG. 4, the cover page may be read into computer memory, and the definitions may be applied to harvest the desired information. Thereafter at block 124 of FIG. 4, the client may be presented with a user interface screen prompting them to validate any file splits or mined data. A user interface screen may further prompt a client to fill in any required information that was not automatically mined or carried forward from another application or document.

Upon reviewing and approving all or a portion of a presented document list that comprises a payload package, the operating system 38 may create the package at block 126. Where so configured, creation of the payload package may be conditioned upon receiving validation from the client at the computer 12 as to the accuracy of the data presented at block 124. Creation of the package at block 126 may be accomplished prior to or concurrently with storage and/or delivery of the package. For instance, the payload may be stored at the client computer 12 while the server computer 16 receives the payload package created at block 126.

Figure 5:
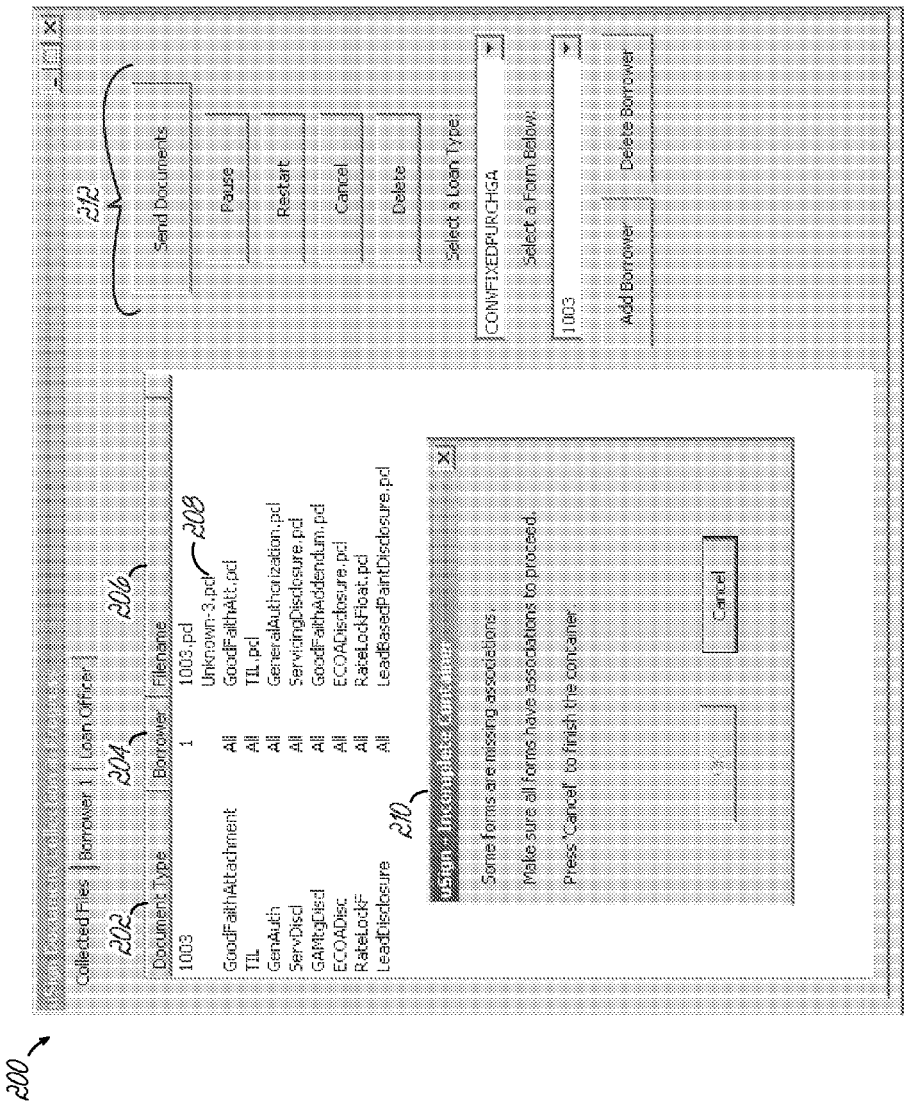
FIG. 5 shows an exemplary computer interface screen for displaying information indicative of files contained in a draft payload package processed by the methods of FIGS. 3 and 4.

FIG. 5 shows an exemplary user interface screen 200 that includes information indicative of files contained in a draft payload package. Such a screen 200 may be presented to a user in the context of block 124 of FIG. 4. That is, the screen 200 of FIG. 5 is presented to the client so that they may validate or otherwise acknowledge the contents of a payload package. As shown in FIG. 5, the files comprising the package are associated with a type 202, a borrower 204 and a filename 206.

The screen 200 communicates to a client whether a document type was recognized or remains unknown 208. The screen 200 further includes a prompt dialog box 210 configured to cause the client to enter additional data. User interface commands 212 along the side of the screen 200 allow a user to send the package and add/delete a borrower, in addition to other features. Where desired, the user may delete unknown or unwanted documents using the command buttons 212 of the screen 200 prior to sending the package.

Figure 6:
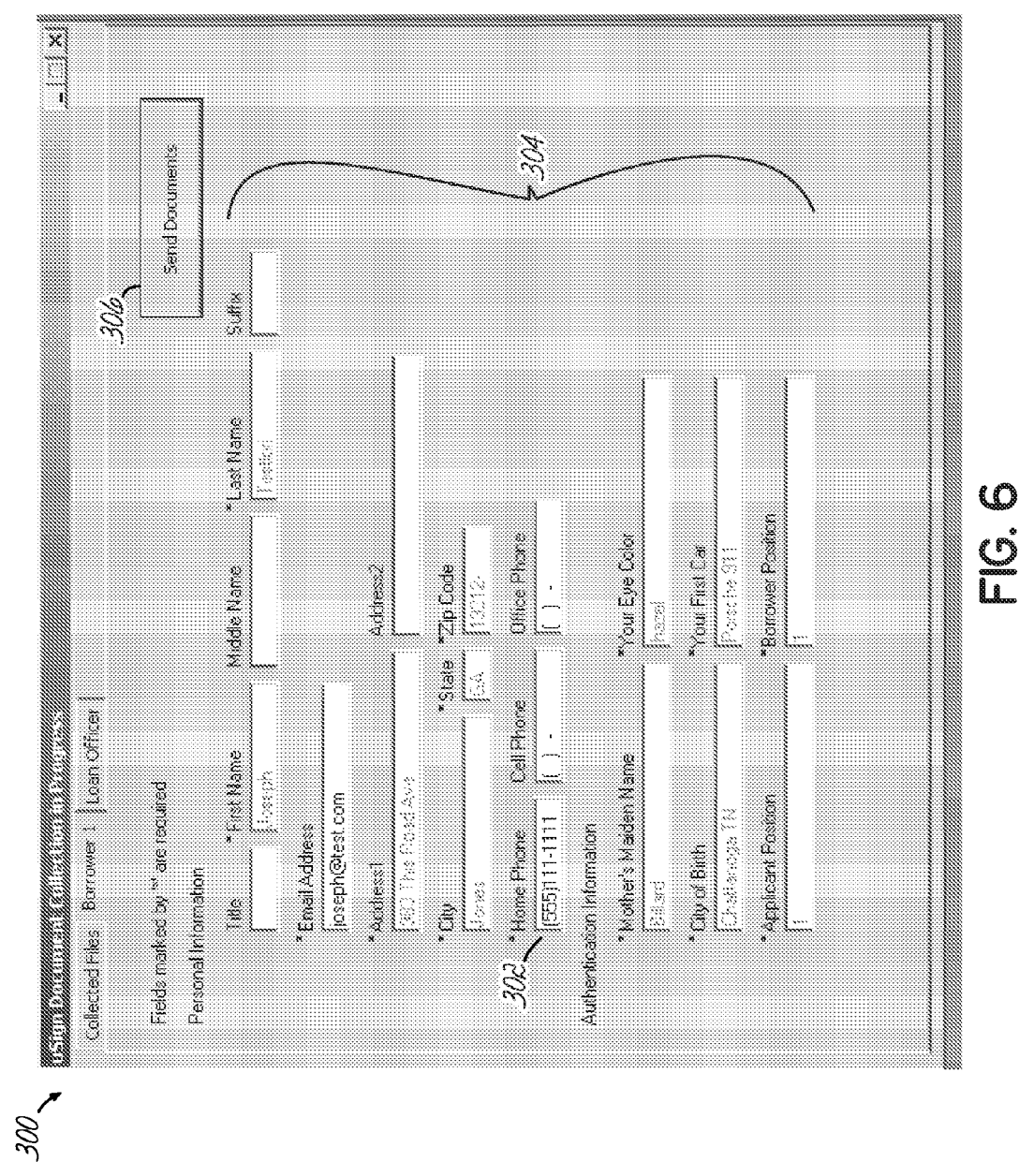

FIG. 6 shows another exemplary user interface screen 300 having application within the processes of FIG. 4. More particularly, the exemplary screen 300 includes cover page information that may be stored into memory at block 122 of FIG. 4. Such cover page information may include fields relating to data that may have a subsequent use, independent of a single document field. For instance, a home phone number field 302 may be used to automatically populate additional forms at some later time. After reviewing the cover sheet information of the screen 300 the user may elect to change the content of select fields 304 and/or include the cover sheet in a package to be sent to the server by clicking on a "send" button 306.

Figure 7:
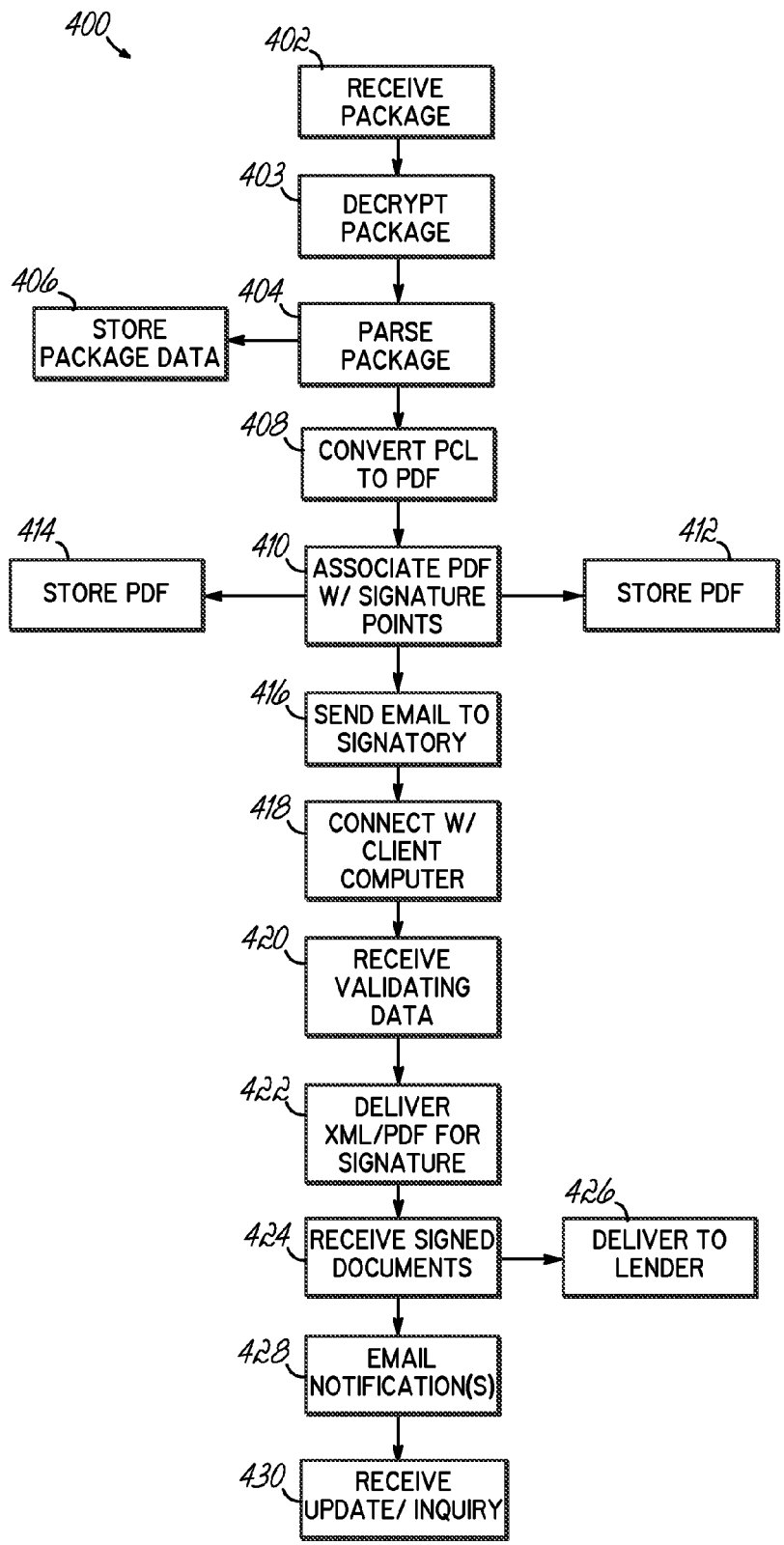
FIG. 7 is a flowchart having a sequence of steps executable by the server computer of the system of FIG. 2 for receiving, causing to be executed and reporting the status of the document payload package.

FIG. 7 is a flowchart 400 that includes an exemplary sequence of steps suitable for execution by the server 16 of FIG. 2. More particularly, the steps of the flowchart 400 are configured to receive, cause to be executed, and to report on the status of the document payload package. Such a package may be generated by the processes of FIG. 4. As shown at step 402 of FIG. 7, the server 16 may receive the payload package. Reception of the payload package at block 402 may additionally include decryption processes. Such encryption and decryption features as discussed herein provide additional data security for users. The operating system 36 of the client server computer 16 may parse the payload package at block 404. This parsing feature may include sampling XML data and PCL documents. Such XML and PCL data may be stored within a container 38 at block 406 of FIG. 7.

The operating system 36 may convert the PCL data to PDF files at block 408. Where desired, the PDF file may be stored within one or more containers 38. The PDF file is associated at block 410 with signature points using XML, boolean and/or text input. For instance, a PDF document may include a text entry box where text can be input by the user. These signature points include locations and paths within a document. All modified documents are stored as elements of one or more containers 38 at block 412. As represented by block 414, a loan officer or other designated person may at all times view the status of all documents and prints, as well as updates authentications, re-sends, emails and other client/server actions.

At block 416 of FIG. 7, the server may initiate the delivery of an email to a recipient borrower/signer. The email may include a Uniform Resource Location (URL) link. A URL is a term for a generic Internet location identifier. That is, the URL identifies an address within a distributed network system. The user may click on the URL link to initiate a process for viewing remotely stored information on their local computer. In another embodiment, the information may be automatically sent over a network connection to the addressee in an email, for example. In either case, the addressee may view the information on their local computer as a result of the server becoming connected to the signer at block 418 via the URL. As with any embodiment discussed herein, the user may optionally be required to demonstrate access to the information. For instance, the system may create a PDF or other document containing a code or other access demonstration document that the user must view and enter on a web page to demonstrate that the user is able to view the documents as they are subsequently delivered. That is, when the user attempts to sign a subsequent document, the access demonstration document is presented to the user. The user is required to return the code as part of the authentication. Once connected at block 418, the server 16 may prompt the signer to validate information displayed from the server 16 on their local computer 12 at block 420. Such prompting may include causing the client to retrieve and submit auxiliary information, such as pay stub information and/or a scanned medical form.

At block 422 of FIG. 7, the server computer 16 may hand off a document set comprising XML and/or PDF files to a signing computer 18. When the document set is delivered to the signing computer 18, it includes all proper formats, flags and other cues required by the signing computer to execute an electronic signature. Such cues may include signature, text or boolean markers, e.g., a checkbox that can be checked and unchecked. In this regard, processing consistent with the present invention is compatible and actually augments existing electronic signing services.

The signing computer 18 may cause the PDF and XML documents to be electronically signed. The server computer 16 receives data associated with the modified PDF and XML files at block 424. The arrival of the signed PDF and XML information at block 424 may trigger the electronic document delivery of the signed documents to a loan officer at block 426. This step at block 426 may be accomplished concurrently with another at block 428 that includes emailing status information to the loan officer at block 428. At any time during a loan document signing process, the signer can return to review or sign documents at block 430 of FIG. 7.

Figure 8A:
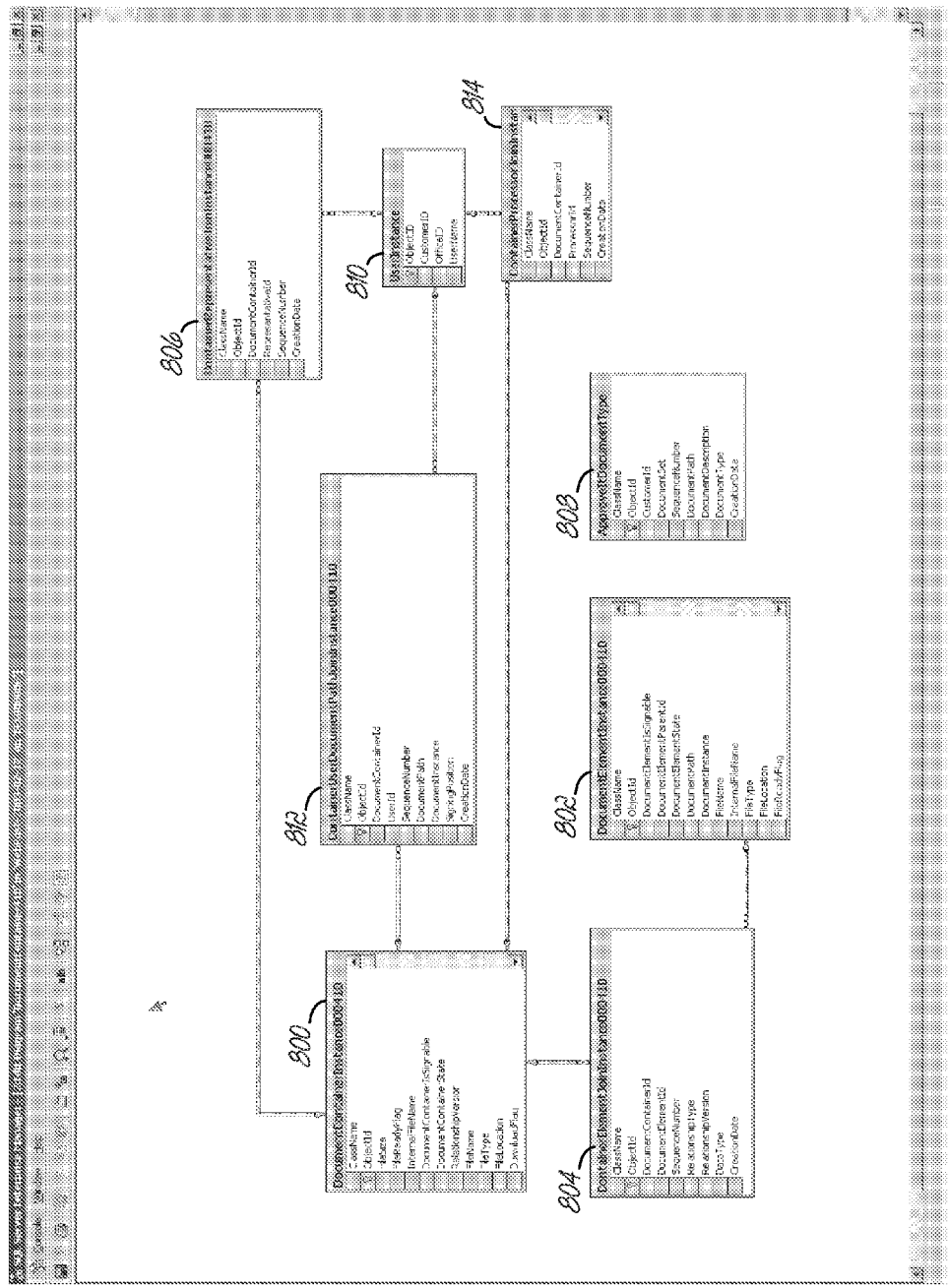
FIG. 8A illustrates data structures in the server of FIG. 2 for storing data regarding a container and the elements in the container.

FIG. 8A illustrates the data structures in the server for storing data regarding a container 38 (document set) and the elements (documents) in the container 38. Each container 38 is represented by a record in the DocumentContainerInstance table 800. Records in table 800 include fields for a container identifier, the container file size, a file ready flag which indicates whether the container 38 is ready for signing, fields for indication whether the document container 38 is signable and the state (signed, unsigned, in progress) of the container. Further fields identify a version number, and the file name, name and file type and location.

Each element of each container 38 is represented by a record in the DocumentElementInstance table 802. Records in table 802 include an identifier, flags to indicate whether the document is signable, and the state of the element. Further fields identify the parent container, and the document path (document type information) associated with the document. Fields also store the internal and external file name, type and location for the document, and indicate whether the file is ready for signing.

Containers 38 are linked to elements through a ContainerElementJoinInstance table 804. Records in table 804 include an identifier and fields with the identifier for a container and a related element, as well as a sequence number and an identifier for the type and version of the container-element relationship, data type for the relationship and creation date.

The locations of signatures to be entered on elements, are identified by records in an ApproveItDocumentType table. This table includes fields for identifying a document set, an associated document path, which is a pointer to a data structure with the locations for signatures on the document, and a description and type code for the document.

Containers 38 are also linked to representatives (e.g., loan officers) handling those containers, through a ContainerRepresentativeJoinInstance table 806. Records in table 806 include an identifier and fields for the identifier of a container and a user identifier of a representative, thereby linking the container to the representative. The links stored by table 806 may be used to quickly identify all documents being handled by a representative for displays such as those noted herein.

Containers 38 are also linked to document signers (e.g., loan applicants) through a ContainerUserDocumentPathJoinInstance table 812. Records in table 812 include an identifier, a container identifier, a user identifier for the document signer, a document path identifier for a document path containing the signature locations for the document. The links stored by table 812 may be used to quickly identify all documents awaiting signature by a given applicant for displays such as those noted herein.

Containers 38 are also linked to administrative personnel, known as "processors", by a ContainerProcessorJoinInstance table 814. Records in table 814 include an identifier, a container identifier, and a user identifier for the processor.

All users (whether representatives, signers, or processors) are identified by records in a user instance table 810. Users are identified in table 810 by a customer (bank or other institution) identifier, an office identifier (to identify which of potentially multiple offices of the customer where the user is located) and a user name.

Figure 8B:
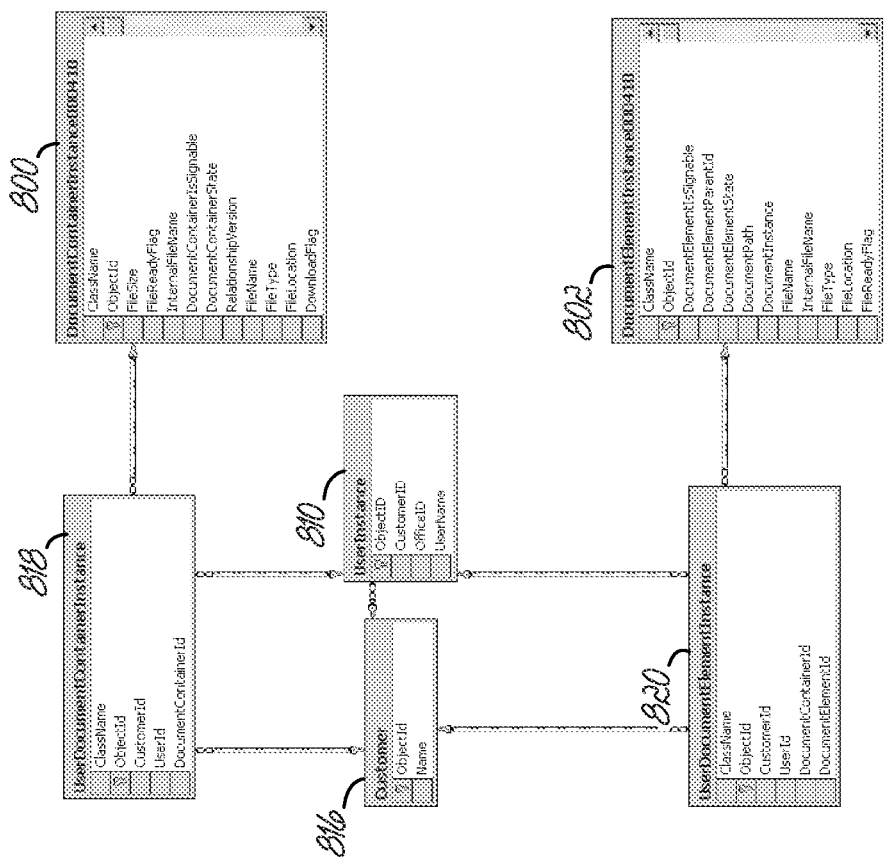
FIG. 8B illustrates additional data structures in the server of FIG. 2 further linking tables for users, customers, containers and elements.

Referring now to FIG. 8B, further linking tables for users, customers, containers and elements are illustrated. Each customer (e.g., bank that uses the system) is represented by a record in table 816 providing an identifier and the customer name. Each user, as noted above, is represented by a record in table 810. Users are linked to the customers by the inclusion of a customer identifier in each user record, as seen in table 810. Users and customers are further linked to containers and elements through linking tables 818 and 820. Table 818 links customers and users to container instances in table 800, by records each identifying a customer, user, and container identifier. Table 820 links customers and users to element instances in table 802, by records each identifying a customer, user and container and element identifiers. Utilizing these tables the containers and elements of a user or customer can readily be identifier.

Figure 8C:
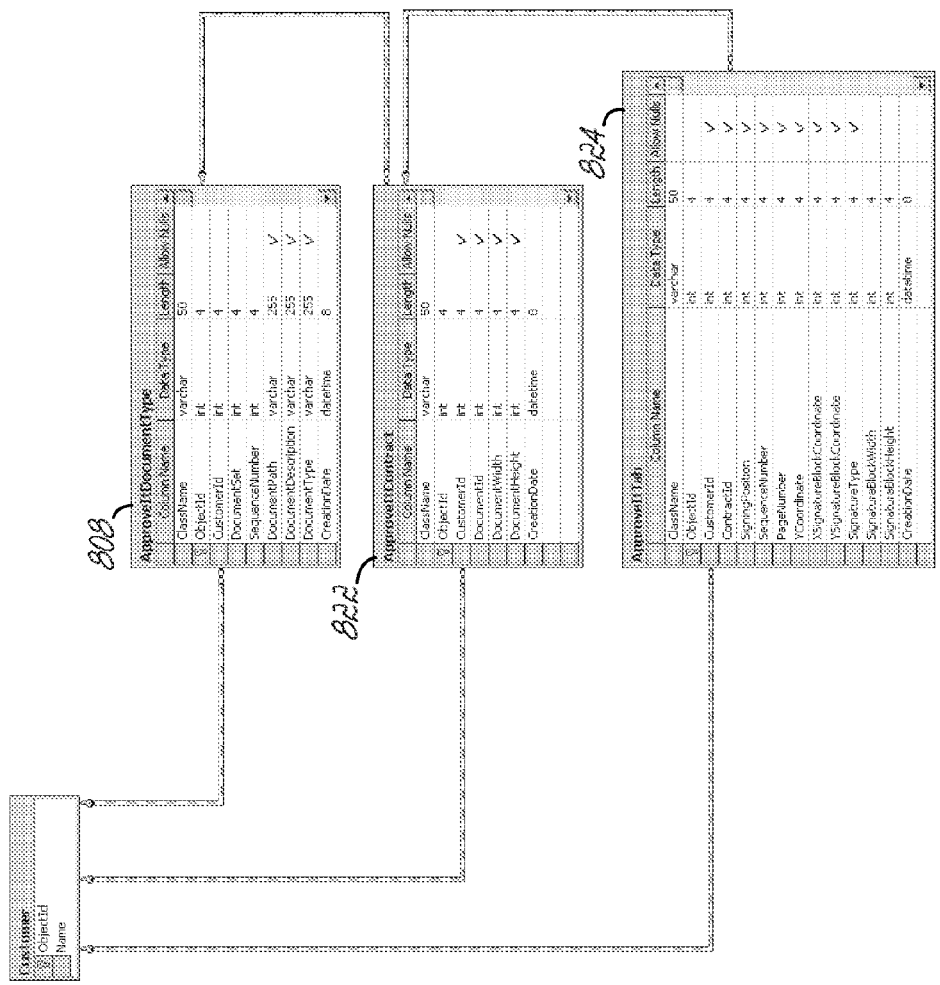
FIG. 8C illustrates tabled data outlining details that regard the storage of signature positions in a document generated according to the processes of FIG. 7.

Referring now to FIG. 8C, details on the storage of signature positions in a document can be explained. Specifically, records in the ApproveItDocumentType table 808 noted above, are linked in a one-to-many relationship with signature positions in the associated document, through the records in an ApproveItContract table 822. Each record in table 822 includes a contract identifier uniquely identifying the record, and a document identifier that identifies a corresponding document type record in table 808. The records in table 822 further identify the dimensions of a document. Records in the ApproveItTab table 824 identify specific locations in a document for signatures. Specifically, each record in table 824 includes an identifier of a contract that is associated with one record in table 822, and further includes fields for identifying a signing position, sequence number, page number, horizontal and vertical coordinates and a signature type and size. Elements are thus readily prepared for signature by retrieving all signature locations from table 824 associated with the contract identifier in table 822 associated with the document path of the element in question.

Figure 8D:
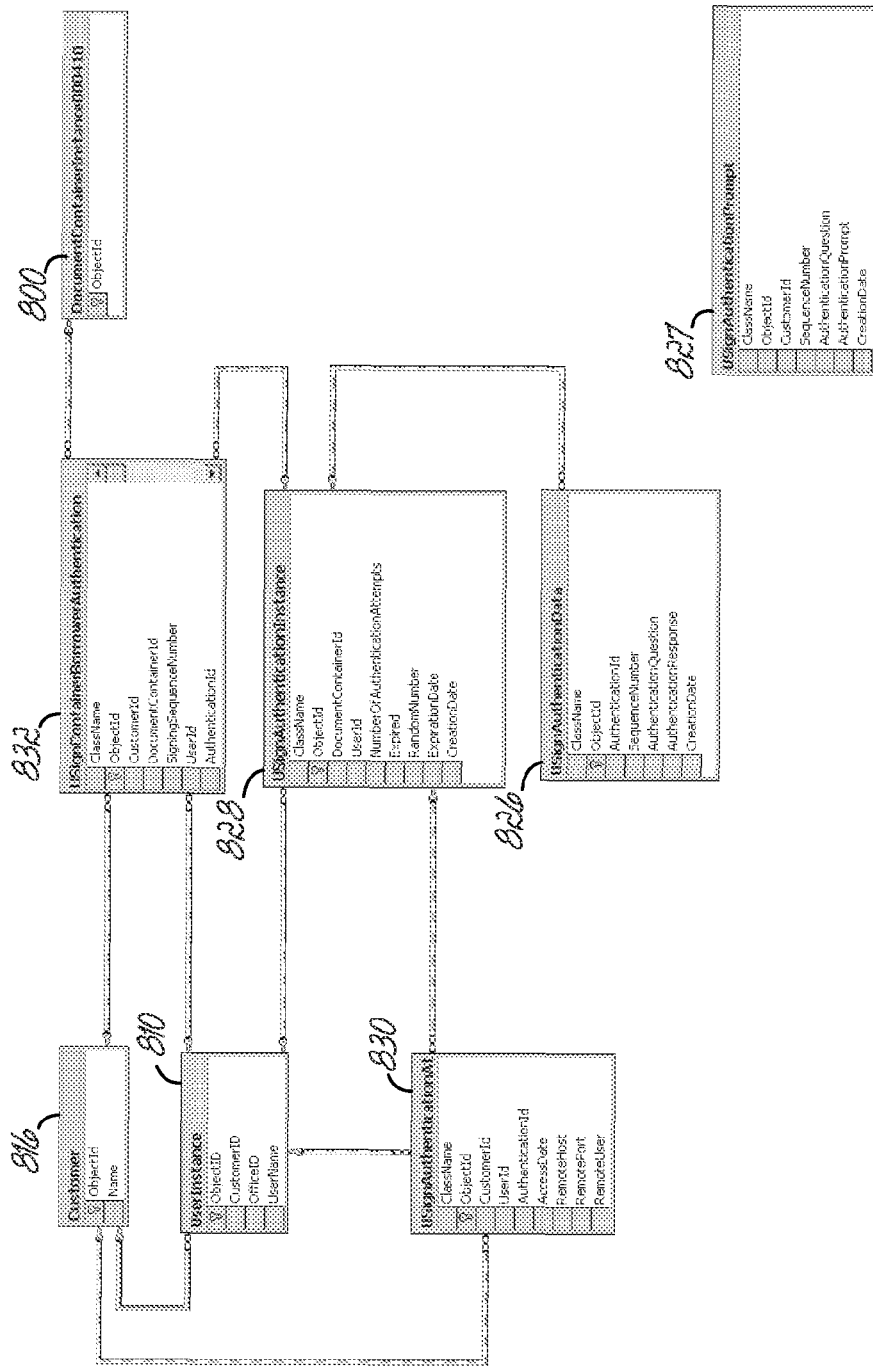
FIG. 8D illustrates tabled data that outlines details that regard the authentication of users accessing the server of FIG. 2.

As noted herein, users are authenticated upon sign-in to the system. This process utilizes the authentication information stored as shown in FIG. 8D. Authorization data is stored in a USignAuthenticationData table 826, specifically, records in table 826 identify a question and a response that is part of authenticating a user. Thus, records in table 826 would identify, for example, a "mother's maiden name" question and an answer for that question, or a "childhood street" question and an answer to that question. "Friendly" versions of the questions (which may be more verbose) are stored separately in a records of a USignAuthenticationPrompt table 827, each of which identifies a question and a "prompt" or longer and friendlier version of the question for screen display.

Multiple questions are typically posed to a user for authentication; therefore, multiple question/answer records in table 826 are associated with each user authentication instance in table 828. Each user that is authenticated has a single record in table 828, which includes the identifier of the user, container, the number of authentication attempts made (which allows for a security lockout of a user after an excessive number of failed authentication attempts), a flag indicating whether the user's authentication data has expired, and expiration and creation dates to be used in tracking the expiration of authentication data.

Each attempt at authentication is tracked by the system, with a record in the USignAuthenticationAttempt table 830. Records in this table are generated each time any user attempts authentication. Each record lists a customer and user identifier, and an authentication identifier for the record in table 828 used for authentication, and identifies an access date (date of attempted authentication), and fields identifying the remote host, port and user associated with the attempted authentication.

Each container 38 is linked to the authentication needed for the signers needed for the container, by a USignContainerBorrowerAuthentication table 832. Each record in table 832 links a container to authentication information for a signer of the container, and includes field identifying the customer and user identifiers, the container identifier, and the authentication instance identifier linking that user, container and customer to an authentication instance record in table 828.

Figure 8E:
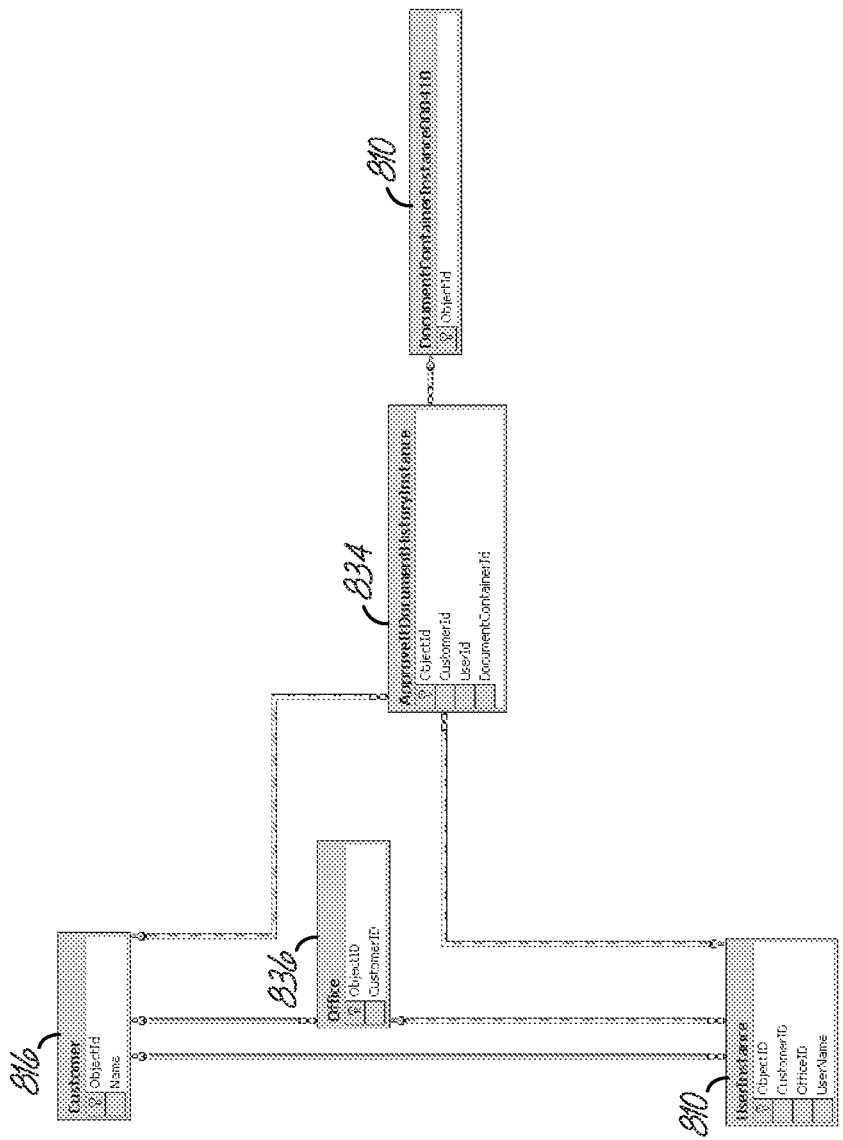
FIG. 8E illustrates tabled data that outlines details that regard the tracking of signing events occurring within the system of FIG. 2.

As with authentication, each signing event is tracked by the system, in the tables shown in FIG. 8E. An ApproveItDocumentHistoryInstance Table 834 identifies signing history. The event of a signing of a document is recorded by storing the identifier of the document container record in table 810 for the signed document, the identifier of the customer and user involved. By recording such historical data, the requirements of UETA and ESIGN are met.

FIG. 8E also illustrates the Office table 836, which may be used with customers having multiple offices, to identify users associated with a particular office of the customer, so that personnel at one office may overview only those documents in process for that office.

Figure 9:
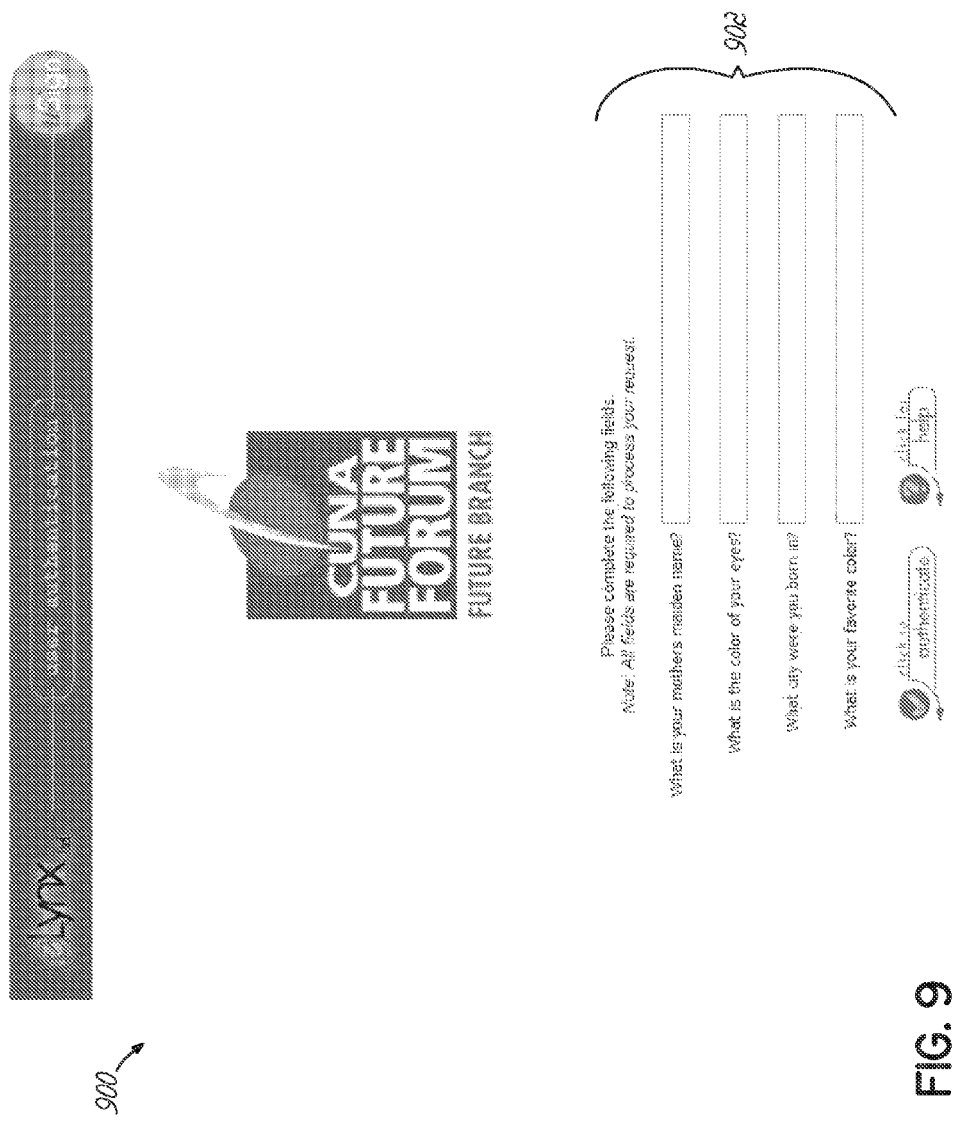
FIG. 9 shows an exemplary computer interface screen configured to verify that a person logging in as a designated signatory is, in fact, authorized to do so.

FIG. 9 includes a user authentication screen 900 useful in verifying that a person logging in as a designated signatory is, in fact, authorized to do so. To this end, the exemplary screen 900 includes fields 902 configured to test or otherwise authenticate the party attempting to log in. As discussed herein, such fields 902 may be customized according to client security or other preferences. The data populating the answers to the corresponding fields 902 may be retrieved from the PCL data, such as from a cover sheet. Other such data may be provided using another secure means.

FIG. 10 shows another exemplary screen 910 that may be presented by the server computer 16 to a client computer 12 after the client successfully logs ins. The screen 910 includes identifying information 912, as well as status information 914 pertaining to pending documents.

Figure 11:
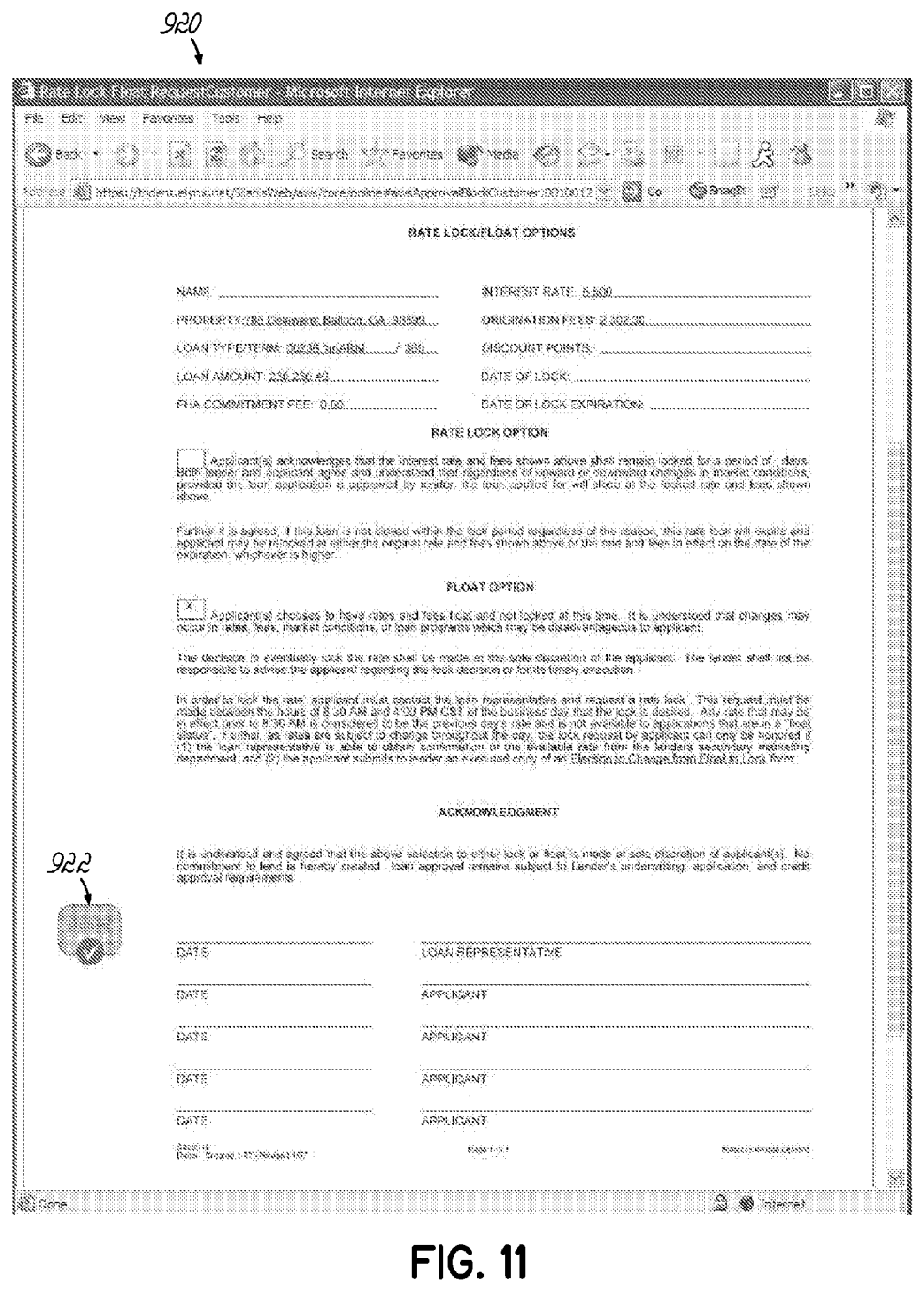

FIG. 11 includes an exemplary user interface screen 920 that includes a document configured for electronic signature. After reviewing the document of the screen 920, the user may click on a signature button to electronically sign the document. FIG. 11 further shows boolean input in the form of a select checkbox under the "FLOAT OPTION" of the form. As also shown in FIG. 11, the form is pre-approved on the signature line at 922. Where multiple signatories are required, each signatory may be separately and/or privately linked for execution of the document set. Where desired, multiple persons may sign concurrently on separately displayed, private versions of the document. That is, two signers may view a document simultaneously. They may be presented with their own signature blanks. Because the documents are handled separately, one person does not need to see the other person's signatures, even if they have already been made.

It will be appreciated that multiple forms of logical structures may be implemented in connection with boolean input. For example, a boolean input structure (e.g. checkbox) may require or not require a response. Similarly, a text input structure may require or not require a response. Furthermore, boolean input structures may be grouped, and the group may be logically structured so that the selections are mutually exclusive (selection of one in the group unselects the others, as in the lock-in and float options presented in FIG. 11) or may not be so structured. Also, a selection of one of the check boxes may be required, nor this may not be required. Moreover, a boolean input may be linked to a text input field, such that when the boolean input is true (e.g., checkbox is checked), input to the text field is permitted, and not otherwise. Text may be required if the linked boolean input is true, or may not be required even though the boolean input is true. Entry of text may cause the linked boolean input to be changed to a true value, or such entry may be prevented until the linked boolean input is first changed to a true value. The boolean input may be changed to false if the text is erased, or this may not occur. Also, if the boolean input is changed back to false (box is unchecked), the text may be erased, or the text may be made invisible or unprintable even though not erased, or the text may remain visible, but uneditable, even though the linked boolean input is false (box is unchecked).

Requirements for input may be enforced in various manners. For example, the user may be made to sign any page that has boolean or text input. The user may be prevented from signing until all required boolean/text inputs on that page have been provided. However, pages may be logically marked so that signatures are required, or not required, prior to viewing subsequent pages. Furthermore, the presence of existing signatures may be subjected to logical analysis so that, e.g., where a signature is required only by one party of a multyparty transaction, the other signatures are not treated as required when a signature has already been obtained.

Figure 12:
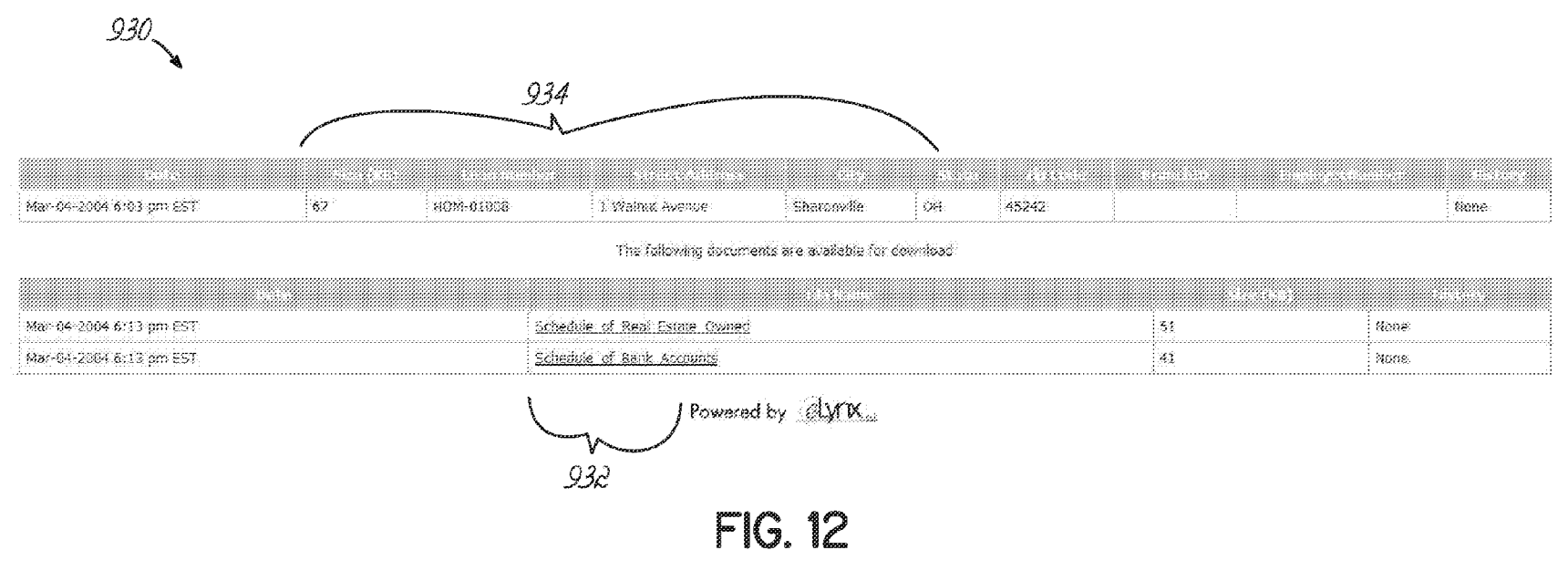

FIG. 12 is an exemplary user interface screen 930 that includes a listing of documents 932 available for download and incorporation into a payload package. Other identifying information 934 pertinent to the loan applicant is included in the screen 930.

Figure 13:
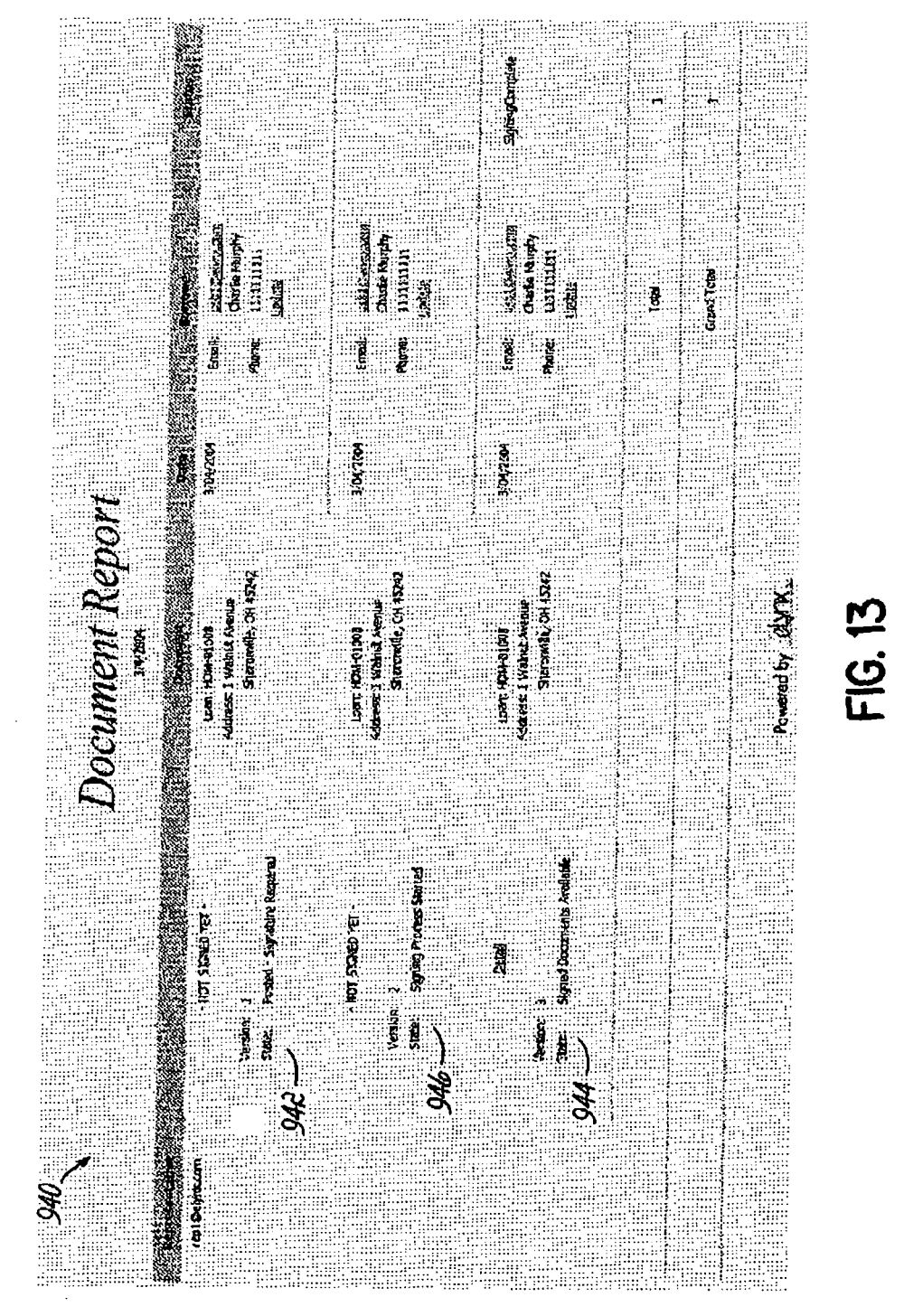

FIG. 13 shows an exemplary user interface screen 940 that includes information pertaining to the status of a document. Such a document report as is shown in the screen 940 may be viewed by either or both a lender or a borrower. Status information may or may not also include information pertaining to other signatories of a given document. As shown in the browser screen 940, status indications may range from no signature at field 942, to a signed, completed document at field 944. Still another status indication may include some intermediary stage of completed signatures at field 946.

While the present invention has been illustrated by a description of various embodiments, and while these embodiments have been described in considerable detail, it is not the intention of the applicants to restrict or in any way limit the scope of the appended claims to such detail. For instance, while the exemplary sequence of steps shown in FIGS. 3, 4, and 7 may have particular utility in certain contexts, it should be understood that the order and content of such steps may be rearranged, omitted, augmented or otherwise modified to suit alternative embodiments and application requirements.

Additional advantages and modifications will readily appear to those skilled in the art. For instance, features of the invention ensure that users are prompted to acknowledge the form type, as well as any other information that must be considered by a client for a proper electronic signature to occur. Thus, the invention in its broader aspects is therefore not limited to the specific details, representative apparatus and method, and illustrative example shown and described. Accordingly, departures may be made from such details without departing from the spirit or scope of the applicants' general inventive concept.

What is claimed is:

1. A method of presenting a signable document to a signer for authentication, comprising
   formatting the signable document as an electronic package, the electronic package utilizing at least a first storage format,
   responding to a request to sign documents from a signer by presenting the signer with an access demonstration document formatted in the first storage format;
   requiring delivery from the signer of information presented in the access demonstration document;
   in response to correct delivery by the signer of information presented in the access demonstration document, presenting the signable document to the signer in an authentication session of the signer; and
   acquiring authentication of the signable document from the signer in the authentication session.

2. The method of claim 1 wherein the access demonstration document identifies a code, and presentation of the signable document proceeds after signer entry of the code identified in the access demonstration document.

* * * * *